Figure 1A:
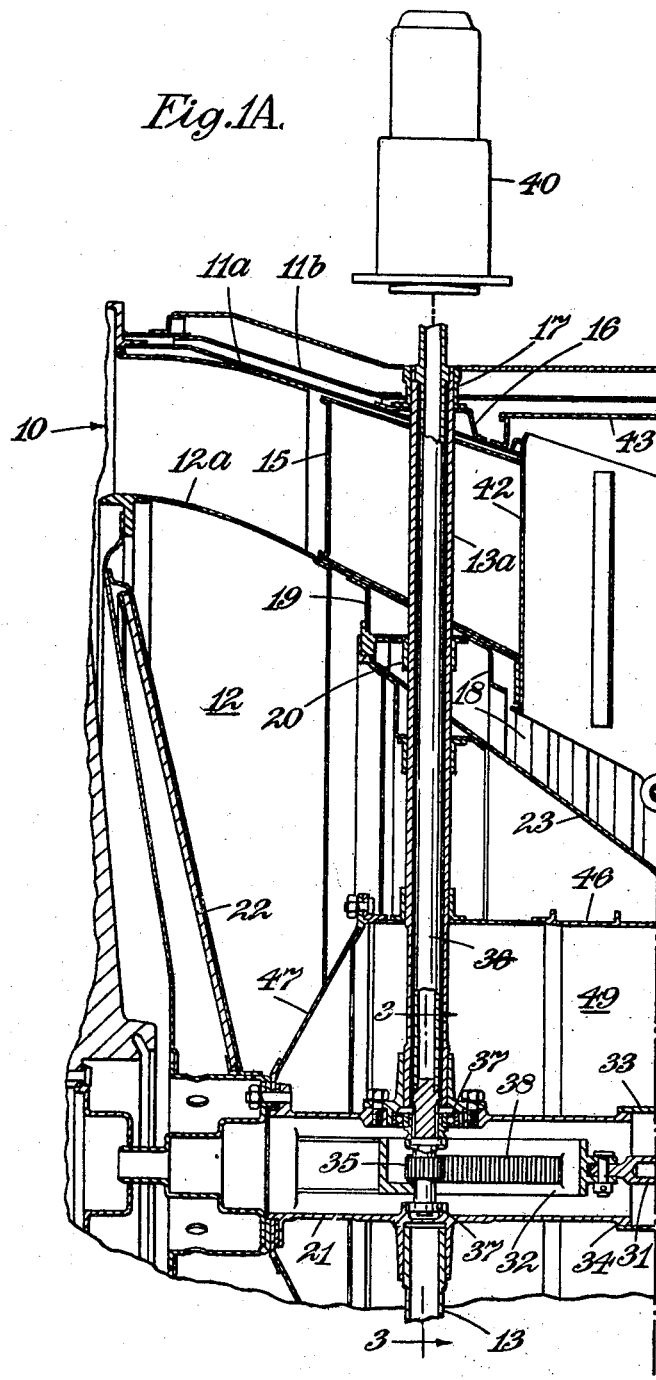

Dec. 11, 1951   R. JANES   2,578,478
GAS-TURBINE ENGINE
Filed June 21, 1948   6 Sheets-Sheet 1

INVENTOR
RALPH JANES
by Wilkinson Mawhinney
Attorneys

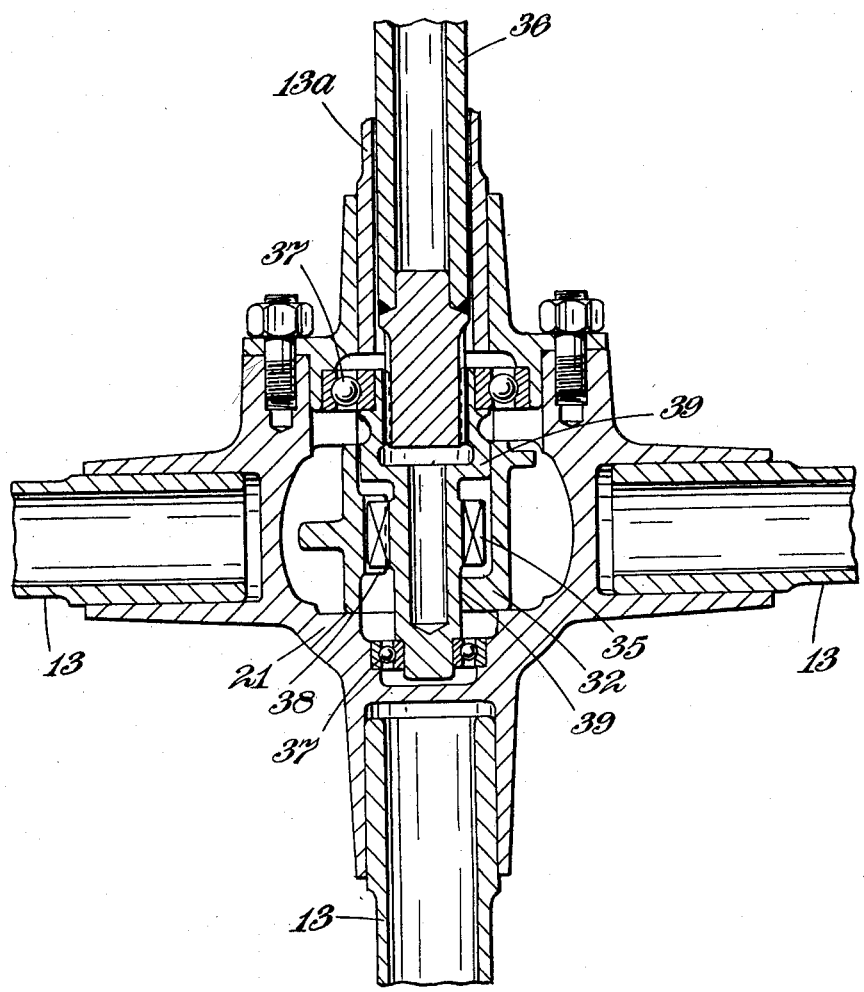

Dec. 11, 1951     R. JANES     2,578,478
GAS-TURBINE ENGINE
Filed June 21, 1948     6 Sheets-Sheet 5
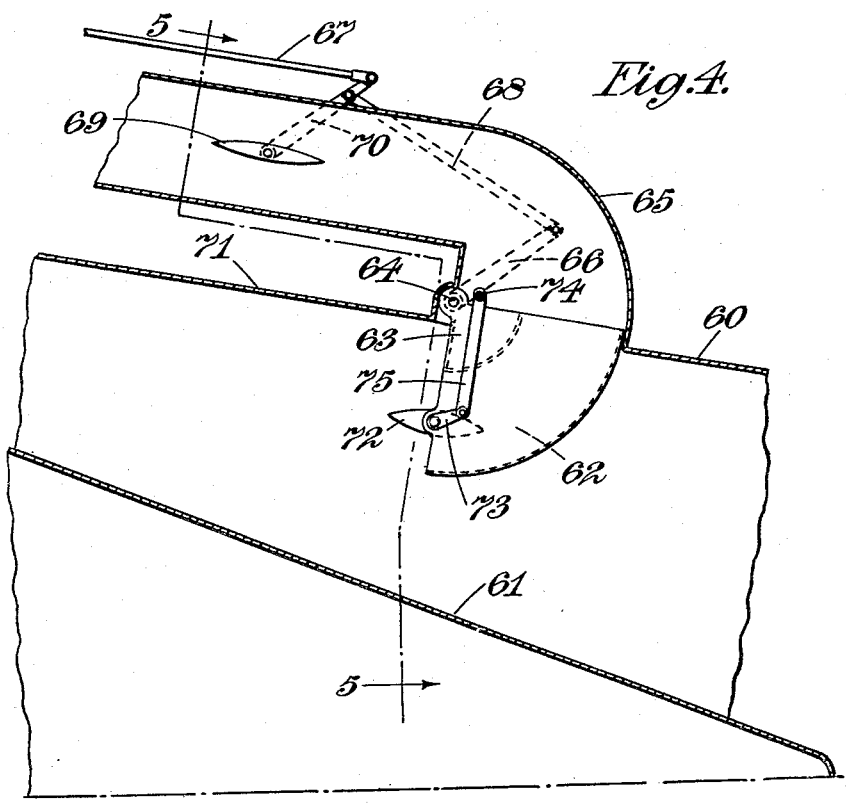
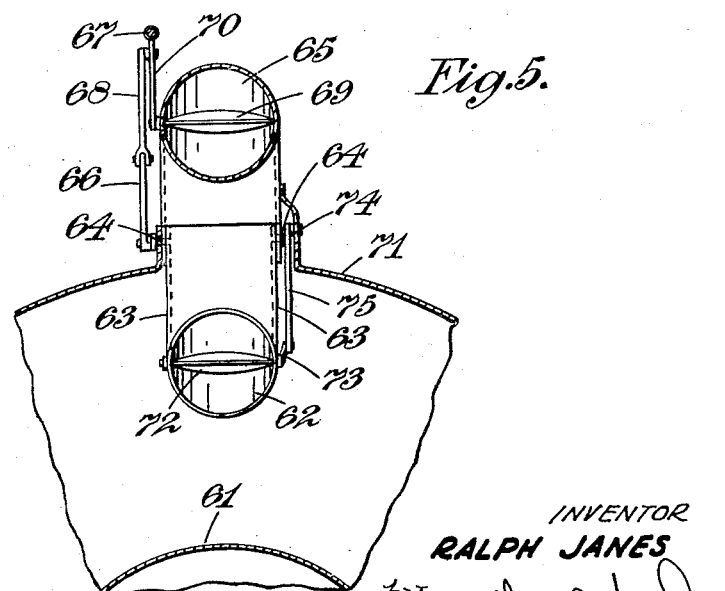
INVENTOR
RALPH JANES
by Wilkinson ...
Attorneys Dec. 11, 1951  R. JANES  2,578,478
GAS-TURBINE ENGINE Filed June 21, 1948  6 Sheets-Sheet 6

INVENTOR
RALPH JANES
By
*Wilkinson + Mawhinney*
ATTYS.

Patented Dec. 11, 1951

2,578,478

UNITED STATES PATENT OFFICE 2,578,478

GAS-TURBINE ENGINE

Ralph Janes, Duffield, England, assignor to Rolls-Royce Limited, Derby, England, a British company Application June 21, 1948, Serial No. 34,310
In Great Britain June 26, 1947

19 Claims. (Cl. 60—39.09)

1

This invention relates to gas-turbine engines. The invention is concerned with means for abstracting hot gas from the exhaust stream of such engines, for instance for the purpose of introducing the hot gas into the air-intake to the engine for preventing ice formation. The gas abstracted may be used for other purposes including general heating, such as gun-compartment heating on aircraft, and/or for de-icing or ice-prevention on aircraft structures.

The invention has for an object to provide improved means for abstracting hot gases from the exhaust stream.

According to this invention, means to abstract hot gas from the exhaust duct of a gas-turbine engine comprises a scoop device mounted in a wall of the exhaust duct to be movable between a retracted position in which it conforms substantially to the contour of the wall and an operative position in which the mouth of the scoop is in the path of the hot gas and faces upstream with respect to the direction of flow of the hot gas, and means to move the scoop between these positions. In such an arrangement when no hot gas is to be abstracted from the gas stream, the scoop device can be located so as not to obstruct the passage of the gas through the exhaust duct, and in the operative position the static pressure within the exhaust duct is augmented by the dynamic head.

According to a feature of this invention, in an exhaust duct assembly having an outer duct defining wall and a substantially conical inner duct defining wall, the scoop device may be arranged to direct the abstracted gas into the interior of the conical wall and duct means are provided to convey the hot gas across the exhaust channel to outside the exhaust duct assembly.

In a preferred construction according to this feature of the invention, the conical wall is made in two parts, consisting of an apex portion and a base portion, of which the apex portion is arranged to be movable axially towards and away from an inoperative position in which it is continuous with the base portion and a position in which it acts as a scoop and is axially spaced from the base portion. The hot gas is directed by the apex portion, when spaced from the base portion, into a collector space in the base portion and then conveyed by ducts across the exhaust channel to a manifold around the outer duct wall. The apex portion may be carried on a sleeve sliding in bearings in the base portion and a power drive is provided to effect the sliding movement. Balancing means may be provided to reduce the

2 power needed to move the apex-portion against the gas-loads and the balancing means may comprise a piston member sliding in a cylinder, the piston being subjected differentially to the pressures within the collector space and in the exhaust channel in the region of the apex-portion. Conveniently, the ducts for conveying the hot gas from the collector space and the power connection to the apex portion are accommodated in fairings provided to enclose the struts supporting the conical wall within the outer wall.

According to another feature of this invention, one or more scoop devices may be mounted in the outer duct wall to be movable between positions in which they project into the gas stream and positions in which they are located outside the defining wall of the exhaust channel. In such a construction, the scoop may comprise an elbow member pivoted on the duct wall and operated by a suitable linkage to move between the said position. A valve or valves may be provided to close-off the mouth of the scoop or passage from the scoop in the closed position of the scoop and conveniently the valve or valves are operated automatically on movement of the scoop.

Figure 1B:
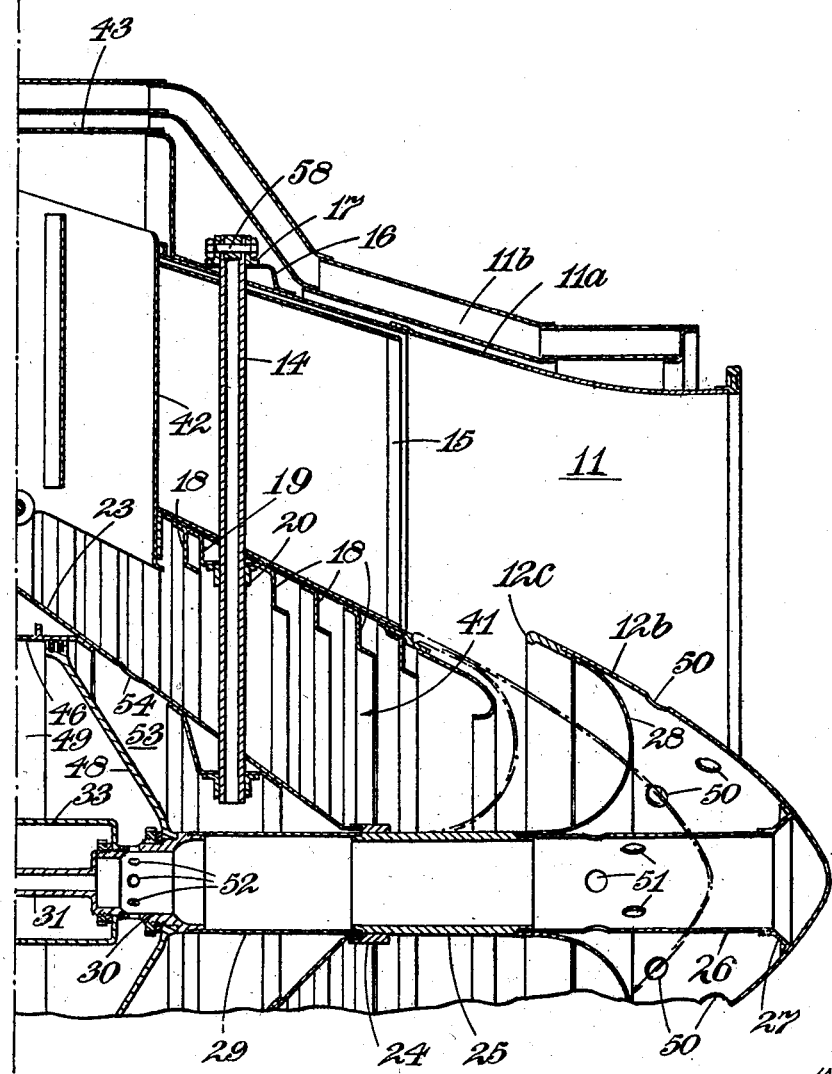
Figure 2:
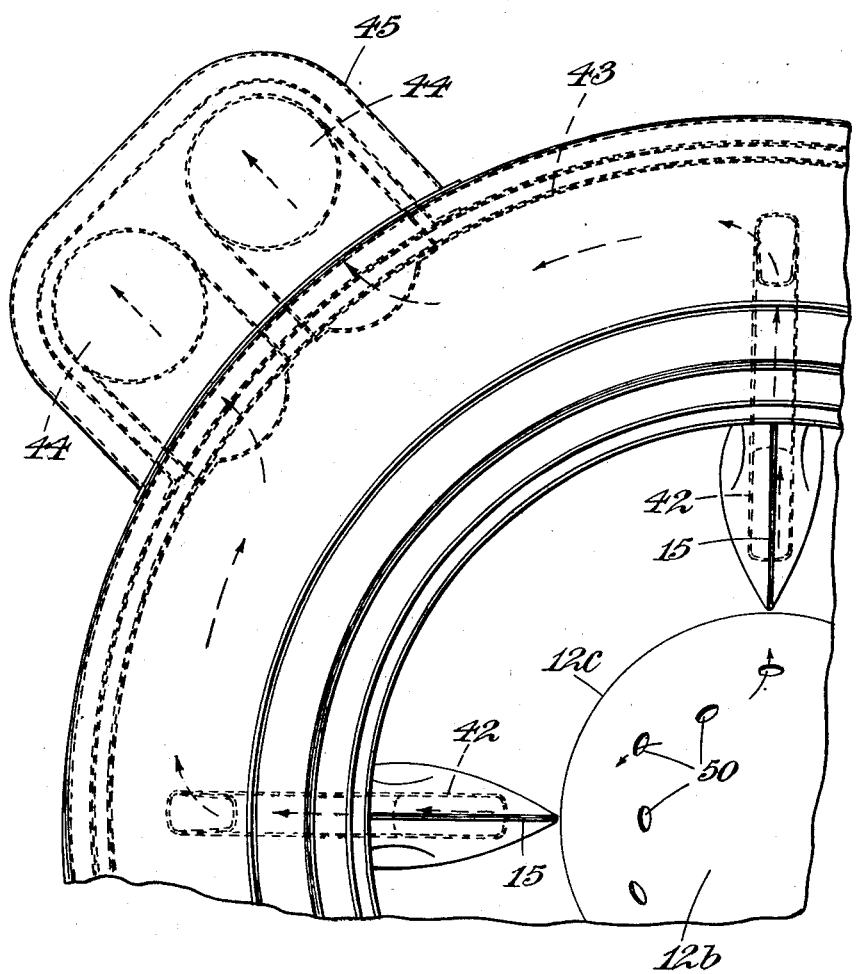
Figure 6:
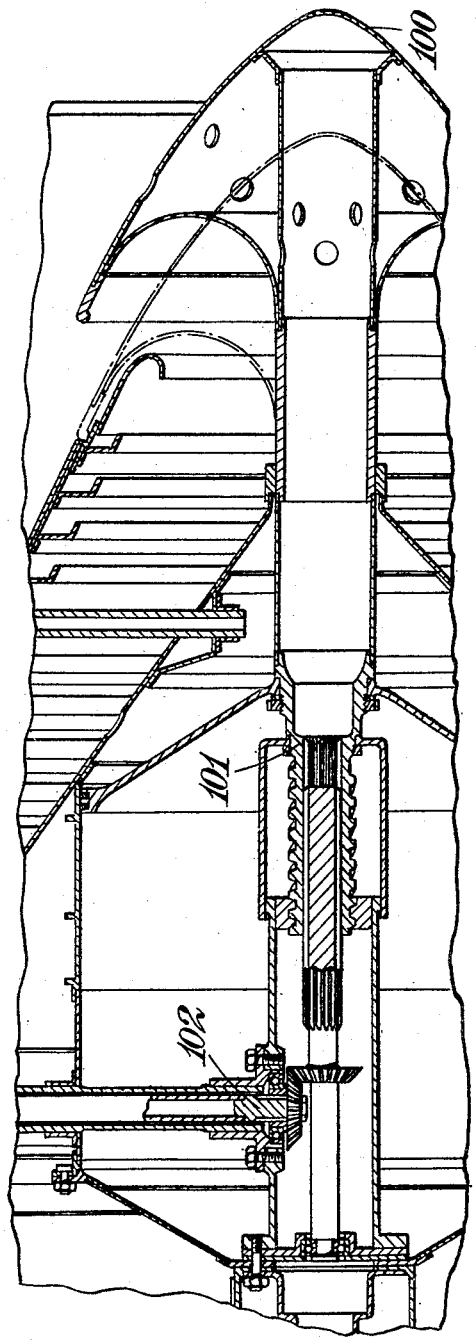

Two embodiments of this invention will now be described by way of example, reference being made in the description to the accompanying diagrammatic drawings in which:

Figures 1A and 1B are adjacent parts of a partial sectional elevation through one embodiment, Figure 2 is a partial end view of Figure 1, Figure 3 is a section on the line 3—3 of Figure 1A, Figure 4 is a diagrammatic view of another construction, Figure 5 is a section on the line 5—5 of Figure 4, and Fig. 6 is a fragmentary sectional view of another embodiment.

Referring to Figures 1A to 3, there is illustrated a part of an exhaust unit for the turbine of a gas-turbine engine.

The turbine is of the axial-flow type and has an annular outlet 10 from which the exhaust gases flow into the exhaust unit which is of the type having a frusto-conical outer wall structure 11 and a substantially conical inner wall structure 12 supported from the outer wall structure 11 by two aligned sets of four struts 13, 14, the struts of each set being arranged in the form of a cross. Each strut 13 and its aligned strut 14 is enclosed where it crosses the exhaust channel, in a common stream-lined fairing 15. The struts 13 engage internally of the inner wall structure 12 with a centrally disposed tubular member 21 which is carried on a heat shield 22 forming the base end of the conical structure.

The outer wall structure 11 comprises an exhaust defining wall 11a and an enclosing double-wall 11b for heat insulating purposes. The wall 11a has strengthening webs 16 welded to it where the struts 13, 14 pass through it and these webs 16 provide seats for bushes 17 receiving the outer ends of the struts 13, 14. Bolts 58 are provided to locate the ends of the struts in the bushes 17.

The conical inner wall structure 12 has an exhaust channel defining wall strengthened internally by cranked webs 18 and by webs 19, these latter carrying bushes 20 through which the struts 13, 14 are capable of sliding.

The channel defining wall of the inner wall structure is divided into two parts, a base portion 12a, and an apex portion 12b, the latter of which is arranged for movement axially towards and away from the base portion 12a. The apex portion 12b is supported in a manner now about to be described.

Within the conical structure 12, there is arranged a frusto-conical wall 23 which at its larger end is secured to the web 19. At its narrower end the frusto-conical wall 23 has secured to it a cylindrical flange 24 providing a bearing surface for a bearing sleeve 25 slidable within the flange 24. The sleeve 25 has welded to it at one end a thinner tubular extension 26 carrying at its free end a flange 27 which is secured to the apex portion 12b. A curved-section annular plate 28 is located within the mouth of the apex portion 12b with its concave surface facing towards the base portion 12a and is welded at its outer and inner edges to the apex portion 12b and the tube 26 respectively.

The other end of the sleeve 25 has secured to it a tubular member 29 which has a tubular flange member 30 secured to its end remote from the sleeve 25. The member 30 carries a plate with an axially-directed part 31 which is linked to a rack member 32. The flange member 30 also carries a second bearing sleeve 33 which slides on a thickened lip 34 on the end of the fixed tubular member 21.

The rack member 32 meshes with a pinion 35 carried by a shaft 36 which extends through one 13a of the struts 13. The shaft is mounted at its inner end in bearings 37 carried by the tubular member 21. The pinion 35 lies within a slot in the rack member 32, one wall of the slot being formed with the teeth 38 of the rack and the other wall being clear of the pinion. The rack teeth 38 are maintained in engagement with pinion by the plain wall of the slot in the rack member 32, bearing at 39 on the end of the shaft 36.

The shaft 36 is driven by a reversible motor 40 located externally of the exhaust unit, so that the rack member 32 can move axially of the exhaust unit drawing the apex portion 12b into the chain line position in which it is substantially continuous with the base portion 12a or pushing the apex portion 12b into the full line position in which the lip 12c of the apex portion 21b lies in the path of the hot gas flowing through the exhaust channel.

In this way the apex portion 12b acts as a scoop to abstract hot gas from the exhaust stream to flow into the space 41 between the wall 12b and the wall 23. The curved plate 28 assists in the reversal of the direction of flow of the hot gas.

The hot gas leaves the space 41 and flows outwardly through ducts 42 which are accommodated within the fairings, 15, and then into an annular manifold 43 extending around the outer wall 11a. The hot gas passes out from the manifold 43 through suitable ducts 44 accommodated in a blister 45 formed externally of the wall 11b.

It will be appreciated that the hot gas enters the space 41 at a relatively high velocity and that the kinetic energy of the gas is converted to a pressure head in the space 41 which pressure head is sufficient to permit the hot gas to be distributed to any desired location in the engine, for example to the compressor air-intake.

In order to balance the forces acting on the apex portion 12a to reduce the power necessary to move it, the following arrangement can be adopted.

A cylinder 46 is mounted within the wall 23 coaxially with the exhaust unit, and the cylinder is closed at its forward end by a dished plate 47. A plate-like piston 48 is secured to the flange member 30 so that as the apex portion 12b is moved towards or away from the base portion 12a, the periphery of the piston 48 slides in the cylinder 46.

The cylinder space 49 on the side of the piston 48 remote from the apex portion 12b is placed in communication with the exhaust channel in the region adjacent the nose of the apex portion 12b through holes 50 in the apex-portion 12b, holes 51 in the tube 26, and holes 52 in the flange member 30. The space 53 on the other side of the piston 48 is in communication with the collector space 41 through holes 54 in the frusto-conical wall 23. Since, as will be seen the outer radius of the plate 48 is substantially equal to that of the apex portion 12b, the forces acting on the moving parts due to the gas pressures in the exhaust unit will be substantially balanced.

The apex portion 12b can be supported in other ways than that described. For instance, as shown in Figure 6, the apex portion 100 may be rotatable and be carried by a threaded sleeve 101 in the base portion and the rotation effected by a power drive 102 so that rotation of the power drive effects the opening and closing movement of the apex portion.

Referring now to Figures 4 and 5, there is illustrated an alternative construction in which instead of a scoop device being provided in the inner wall structure of the exhaust unit, one or more scoop devices are mounted in the outer wall.

The exhaust unit comprises an outer wall 60 and an inner conical wall 61 suitably supported centrally within the outer wall. The scoop device comprises an elbow pipe member 62 formed with quadrant-shaped webs 63 by the angle of which the pipe member 62 is pivotally mounted at 64 in a collector pipe 65. In this way the elbow pipe 62 which constitutes the scoop can swing from a position in which it lies within the collector pipe 65 and out of the path of the exhaust stream, to a position as shown in which it projects into the exhaust stream.

The swinging movement is controlled by a suitable linkage comprising a rocker arm 66 connected to the scoop 62, an operating rod 67 and a link 68 connecting the rocker arm and the operating rod. The linkage is also arranged to operate a butterfly valve 69 through a rocker arm 70 so that when the scoop 62 is retracted, the butterfly closes off the delivery pipe 71.

A second butterfly valve 72 is provided in the mouth of the scoop 62 and is arranged to be closed by the retracting movement of the scoop. For this purpose, the butterfly valve 72 is carried on a spindle in bearings in the end of the scoop and the spindle is provided with an arm 73 connected by a link 75 to a point 74 on the collector pipe 65 eccentric to the pivotal axis of the scoop 62.

I claim:

1. Means for abstracting hot gas from the exhaust flow through an exhaust duct of a gas-turbine engine comprising in combination a scoop device mounted in a duct-defining wall of the exhaust duct at a location between the inlet end and outlet end of the duct; controllable means for moving said scoop device between an operative position where said scoop device intrudes into the gas flow through the duct and presents an inlet area facing the inlet end of the duct and a retracted position in which it is withdrawn from intrusion into the gas flow; gas ducting connecting with said scoop device to lead abstracted hot gas to a location liable to require heating; a part of said scoop device constituting a closure member which part, in the retracted position of the scoop, conforms to the contour of the duct defining wall in which the scoop is mounted, and closes communication between the exhaust duct and gas ducting.

2. Means as claimed in claim 1, wherein the exhaust duct is formed between an outer defining wall and a substantially conical inner wall and wherein there is provided a collector space within said inner wall constituting part of the gas ducting and wherein the scoop device is arranged to direct hot gas into said collector space.

3. Means as claimed in claim 2, wherein the conical wall is provided in two parts constituting respectively the base portion and apex portion of the wall, and the apex portion is displaceable axially of the base portion between an inoperative position in which it is continuous with the base portion and a position in which it is axially spaced from the base portion and form a scoop for the hot gas.

4. Means as claimed in claim 3, wherein the apex portion is carried by a sleeve slidably mounted in bearings in the base portion and means is provided to adjust the sleeve axially of the base portion.

5. Means as claimed in claim 4, wherein the sleeve adjusting means comprises a rotatable power shaft and linking means between the sleeve and power shaft to convert the rotation of the power shaft to sliding of the sleeve.

6. Means as claimed in claim 5, wherein the shaft carries a pinion meshing with a rack member interconnecting the shaft and sleeve.

7. In a gas-turbine engine having an exhaust duct, the combination of an outer defining wall for said exhaust duct; a substantially conical inner defining wall for said exhaust duct provided with a base portion and an apex portion; a sleeve carrying said apex portion slidably and rotatably mounted in bearings in said base portion and having threaded engagement with said base portion so that rotation of the sleeve effects axial movement of the apex portion with respect to the base portion between an inoperative position in which said apex portion is continuous with said base portion and an operative position in which said apex portion is axially spaced from said base portion and constitutes a scoop device intruding into the gas flow through the exhaust duct and presenting an inlet area facing the inlet of said exhaust duct; a collector space within said conical wall arranged to be in communication with said exhaust duct when said apex portion is in its operative position and to be closed off from communication with said exhaust duct by said apex portion when it is in its inoperative position; gas ducting between said collector space and a location liable to require heating; and controllable means to rotate said apex portion.

8. Means as claimed in claim 7, wherein the rotation of the sleeve is effected by a power-drive.

9. In a gas-turbine engine having an exhaust duct, the combination of an outer defining wall for said exhaust duct; a substantially conical inner defining wall for said exhaust duct provided with a base portion and an apex portion displaceable axially between an inoperative position in which it is continuous with said base portion and an operative position in which it is axially spaced from said base portion and constitutes a scoop device intruding into the gas flow through the exhaust duct and presenting an inlet area facing the inlet of the said exhaust duct; controllable means to control movement of said apex portion between said inoperative position and said operative position; balancing means to balance the gas loads acting on the apex portion to facilitate movement of the apex portion; a collector space within said conical wall arranged to be in communication with said exhaust duct when said apex portion is in its operative position and to be closed off from communication with said exhaust duct by said apex portion when it is in its inoperative position; and gas ducting between said collector space and a location liable to require heating.

10. Means as claimed in claim 9, wherein the balancing means includes a piston member operatively connected to the apex member and the piston member is arranged to be subjected to the pressure within the collector space to create a load opposing the resultant gas load on the apex portion.

11. In a gas-turbine engine having an exhaust duct, the combination of an outer defining wall for said exhaust duct; a substantially conical inner defining wall for said exhaust duct provided with a base portion and an apex portion; a sleeve carrying said apex portion and slidably mounted in bearings; controllable means to control movement of said sleeve and apex portion between an inoperative position in which said apex portion is continuous with said base portion and an operative position in which said apex portion is axially spaced from said base portion and constitutes a scoop device intruding into the gas flow through the exhaust duct and presenting an inlet area facing the inlet of said exhaust duct; a collector space within said conical wall arranged to be in communication with said exhaust duct when said apex portion is in its operative position and to be closed off from communication with said exhaust duct by said apex portion when it is in its inoperative position; a piston on said sleeve; a cylinder for said piston carried by said base portion; pressure duct means for said cylinder to load said piston differentially by the pressure within said collector space and by the pressure in said exhaust duct adjacent the wall of the apex portion so that said pressure in the exhaust duct assists in moving said apex portion from its inoperative position to its operative position; and gas ducting between said collector space and a location liable to require heating.

12. Means as claimed in claim 11, wherein the wall of apex portion is formed with holes connecting the exhaust channel to the space within the sleeve and the said space communicates with the surface of the piston member remote from the apex-portion, and wherein the surface of the piston member facing the apex-portion is subjected to the pressure within the collector space.

13. In a gas-turbine engine having an exhaust duct, the combination of an outer defining wall for said exhaust duct; a substantially conical inner defining wall for said exhaust duct; a collector space within said inner wall; a scoop device mounted in said inner wall between the inlet end and the outlet end of said exhaust duct; controllable means for controlling movement of said scoop device between an operative position in which said scoop device intrudes into the gas flow through said exhaust duct with an inlet area facing the inlet end of said exhaust duct and connects said collector space with said exhaust duct and an inoperative position in which it is withdrawn from intrusion into said exhaust duct; gas ducting passing through said exhaust duct from said collector space to a location liable to require heating; and aerofoil-section fairings for said gas ducting in said exhaust channel.

14. Means as claimed in claim 13, wherein the fairings also enclose supporting struts for supporting the conical wall from the outer wall.

15. Means as claimed in claim 1, wherein the exhaust channel is formed between an outer defining wall and a substantially conical inner wall and at least one scoop device is retractably mounted in the outer wall.

16. Means as claimed in claim 15, wherein a scoop device comprises an elbow-shape pipe pivoted on the wall to move between an operative position in which the scoop extends into the gas flow through the channel and a retracted position in which the scoop is withdrawn through the wall into a collector space.

17. Means as claimed in claim 16, wherein valve means are provided to close the passage through the scoop and said valve means is arranged to be operated by movement of the scoop between the operative and retracted positions.

18. Means as claimed in claim 17, wherein the valve means comprises a butterfly valve mounted in the mouth of the scoop and a link connecting a lever on the spindle of the butterfly valve to a fixed point which is eccentric to the pivotal axis of the scoop.

19. Means as claimed in claim 18, wherein valve means is also provided in the distributor pipe from the collector space and the valve means is arranged to close the said pipe when the scoop is retracted.

RALPH JANES.

REFERENCES CITED

The following references are of record in the file of this patent:

UNITED STATES PATENTS

| Number | Name | Date |
| --- | --- | --- |
| 1,782,072 | McKinstry | Nov. 18, 1930 |
| 2,402,363 | Bradbury | June 18, 1946 |
| 2,418,488 | Thompson | Apr. 8, 1947 |
| 2,501,633 | Price | Mar. 21, 1950 |